(12) United States Patent
Miyahara

(10) Patent No.: US 6,552,365 B2
(45) Date of Patent: Apr. 22, 2003

(54) PHOTOELECTRIC CONVERTING SEMICONDUCTOR DEVICE

(75) Inventor: Toshiharu Miyahara, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,545

(22) Filed: Nov. 5, 2001

(65) Prior Publication Data

US 2002/0175388 A1 Nov. 28, 2002

(30) Foreign Application Priority Data

May 23, 2001 (JP) ........................................ 2001-153380

(51) Int. Cl.[7] .............................................. H01L 27/15
(52) U.S. Cl. ........................................................ 257/80
(58) Field of Search ........................ 257/80, 443, 432, 257/436

(56) References Cited

U.S. PATENT DOCUMENTS 5,533,041 A * 7/1996 Matsuda et al. ............... 257/80
5,665,982 A * 9/1997 Torikai ......................... 257/80

FOREIGN PATENT DOCUMENTS

JP          7-147352           6/1995

* cited by examiner

Primary Examiner—Tom Thomas
Assistant Examiner—Samuel A Gebremariam
(74) Attorney, Agent, or Firm—McDermott, Will & Emery

(57) ABSTRACT

A photoelectric converting semiconductor device includes a photoelectric converting semiconductor element, a coplanar board and a terminal resistance. A distance W between a signal line and a ground line positioned in an area where photoelectric converting semiconductor element is mounted is made wider than the distance in an area where photoelectric converting semiconductor element is not mounted, and width of signal line positioned in the area where photoelectric converting semiconductor element is mounted is made narrower than in the area where photoelectric converting semiconductor element is not mounted. Thus, when the photoelectric converting semiconductor element is mounted on the coplanar board, variation of characteristic impedance is suppressed.

9 Claims, 9 Drawing Sheets

DISTANCE (μm) BETWEEN
SIGNAL LINE AND GROUND LINE

PHOTOELECTRIC CONVERTING SEMICONDUCTOR DEVICE

BACKGROUND OF THE INVENTION

1. Field of the Invention

The present invention relates to a photoelectric converting semiconductor device and, more specifically, to a photoelectric converting semiconductor device in which impedance variation is suppressed when the photoelectric converting semiconductor element is mounted on a board.

2. Description of the Background Art

A conventional photoelectric converting semiconductor device will be described. As can be seen from FIG. 16, a photoelectric converting semiconductor device includes a photoelectric converting semiconductor element 101, a coplanar waveguide board 102 (hereinafter referred to as "coplanar board") for feeding a modulation signal voltage (hereinafter referred to as "RF signal") to photoelectric converting semiconductor element 101, a terminal resistance 103 for impedance matching and a coupling optical system for input/output (not shown).

On coplanar board 102, a signal line 104 and a ground line 105 are formed. Photoelectric converting semiconductor element 101 is electrically connected to signal line 104 through a bump electrode 106a, and electrically connected to ground line 105 through bump electrodes 106b to 106d. Signal line 104 and ground line 105 are electrically connected through a terminal resistance 103.

An operation of the photoelectric converting semiconductor device will be described. When the photoelectric converting semiconductor element 101 is an electric field absorbing type semiconductor optical modulator element (hereinafter referred to as "optical modulator element"), a continuous laser beam is introduced with high efficiency from the incident side coupling optical system to the optical modulator element.

In the optical modulator element, the amount of laser beam absorption changes in accordance with the voltage applied through coplanar board 102. Therefore, by applying a modulation signal voltage to coplanar board 102, the laser beam emitted from the optical modulator element has its intensity modulated corresponding to the signal voltage, and thus, it is coupled with high efficiency to the emitting side coupling optical system. The conventional photoelectric converting semiconductor device is structured and operates in this manner.

The conventional photoelectric converting semiconductor device, however, has the following problem. First, in the photoelectric converting semiconductor device, in order to have the impedance of the RF signal feeding side (feeding side impedance) matched with characteristic impedance of coplanar board 102, the width of signal line 104 and the distance between signal line 104 and ground line 105 on coplanar board 102 are set to a prescribed width and a prescribed distance.

Here, the width of the signal line 104 and the distance between signal line 104 and the ground line 105 are designed such that the characteristic impedance matches the feeding side impedance with the coplanar board 102 being in a single body state, that is, when photoelectric converting semiconductor element 101 is not yet mounted on coplanar board 102.

Therefore, when photoelectric converting semiconductor element 101 is mounted on coplanar board 102, the characteristic impedance tends to deviate from the value of the feeding side impedance, degrading electrical characteristic of the photoelectric converting semiconductor device.

SUMMARY OF THE INVENTION

The present invention was to made to solve the above described problem, and its object is to provide a photoelectric converting semiconductor device of which variation of characteristic impedance is suppressed when the photoelectric converting semiconductor element is mounted on a coplanar board.

According to the present invention, the photoelectric converting semiconductor device has a board, a signal line, a ground line, a resistance portion and a photoelectric converting semiconductor element. The signal line is formed on and extends over the board. The ground line is formed on the board and extends spaced apart from the signal line. The resistance portion is formed on the board and electrically connects the signal line and the ground line. The photoelectric converting semiconductor element is mounted on the board to cover the signal line and the ground line, electrically connected to the signal line and the ground line to receive a modulation signal transmitted from a power feeding portion for transmitting the modulation signal, and modulates and outputs the received light. The impedance is substantially the same as the impedance of the power feed portion. In order to suppress impedance variation when the photoelectric converting semiconductor element is mounted on the board, an arrangement relation between the signal line and the ground line positioned in an area where the photoelectric converting semiconductor element is mounted is made different from the arrangement relation between the signal line and the ground line positioned in an area where the photoelectric converting semiconductor element is not mounted.

According to this structure, the arrangement relation between the signal line and the ground line positioned in the area where the photoelectric converting semiconductor element is mounted is made different from the arrangement relation between the signal line and the ground line positioned in an area where the photoelectric converting semiconductor element is not mounted, and therefore, variation of the impedance is suppressed when the photoelectric converting semiconductor element is mounted on the board, and the impedance can be set to a value substantially the same as the impedance of the power feed portion. As a result, degradation of electric characteristic of the photoelectric converting semiconductor device can be prevented.

More specifically, the signal line and the ground line positioned in an area where the photoelectric converting element is not mounted extend spaced by a first distance from each other, and the signal line and the ground line positioned in an area where the photoelectric converting semiconductor element is mounted extend spaced by a second distance, which is wider than the first distance.

When the photoelectric converting semiconductor element is brought close to the board, correlation between the characteristic impedance and the distance between the signal line and the ground line shifts from that of the board alone. Here, when the distance between the signal line and the ground line positioned in the area where the photoelectric converting semiconductor element is mounted is made to a second distance wider than the first distance, characteristic impedance variation when the photoelectric converting semiconductor element is mounted on the board can be suppressed, and the value of the characteristic impedance can be set to substantially the same value as the feeding side impedance.

More specifically, the signal line positioned in the area where the photoelectric converting semiconductor element is mounted should preferably have a prescribed width narrower than the width of the signal line positioned in the area where the photoelectric converting semiconductor element is not mounted.

Thus, in the area where the photoelectric converting semiconductor element is mounted, the distance between the signal line and the ground line is substantially made wider than the distance in the area where the photoelectric converting semiconductor element is not mounted. Thus, characteristic impedance variation when the photoelectric converting semiconductor element is mounted on the board can be suppressed, and the value of the characteristic impedance can be set to a value substantially the same as the feeding side impedance.

More specifically, the semiconductor device further includes an additional ground line positioned along the direction of extension of the signal line on the side opposite to the ground line and electrically connected to the ground line, and the distance between the ground line and the additional ground line positioned in the area where the photoelectric converting semiconductor element is mounted is wider than the distance between the ground line and the additional ground line positioned in the area where the photoelectric converting semiconductor element is not mounted.

In this case also, the distance between the signal line and the ground line in the area where the photoelectric converting semiconductor element is mounted is substantially wider than the distance in the area where the photoelectric converting semiconductor element is not mounted. Thus, characteristic impedance variation when the photoelectric converting semiconductor element is mounted on the board can be suppressed, and the value of the characteristic impedance can be set to a value substantially the same as the feeding side impedance.

Further, the semiconductor device includes an additional ground line arranged extending along the direction of extension of the signal line on the other side of the ground line and electrically connected to the ground line, and when the photoelectric converting semiconductor element has an electrode portion electrically connecting the ground line and the additional ground line, it is preferred that the width of the signal line is narrower than the prescribed width.

Thus, the variation of the characteristic impedance derived from parasitic capacitance between the signal line and the electrode portion can be suppressed, and the value of the characteristic impedance can be set to a value substantially the same as the feeding side impedance.

Further, it is preferred that the width of the signal line changes abruptly from the area where the photoelectric converting semiconductor element is mounted to the area where the photoelectric converting semiconductor element is not mounted, and that the photoelectric converting semiconductor element is mounted aligned with the portion where the width changes abruptly.

Thus, the photoelectric converting semiconductor element is mounted on the board aligned with that portion at which the width of the signal line changes. As a result, the position for mounting is made clear, improving accuracy of mounting. As a result, the characteristic impedance variation caused as the mounting position of the photoelectric converting semiconductor element varies can be suppressed, and degradation of electric characteristic of photoelectric converting semiconductor device can be prevented.

Alternatively, the width of the signal line is preferably changed smooth from the area where the photoelectric converting semiconductor element is mounted to the area where the photoelectric converting semiconductor element is not mounted.

Here, reflection on the signal line is suppressed, and troubles resulting from the reflection can be eliminated, so that degradation of the electric characteristic of the photoelectric converting semiconductor device can be prevented.

Further, it is preferred that the signal line and the ground lines positioned in the area where the photoelectric converting semiconductor element is not mounted are arranged on one same plane, while the signal line and the ground lines positioned in the area where the photoelectric converting semiconductor element is mounted are arranged on mutually different planes.

In this case also, characteristic impedance variation when the photoelectric converting semiconductor element is mounted on the board can be suppressed significantly, and in the state where the photoelectric converting semiconductor element is mounted on the board, the value of the characteristic impedance is made substantially the same as remaining two impedance values, whereby degradation of the electric characteristic of the photoelectric converting semiconductor device can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
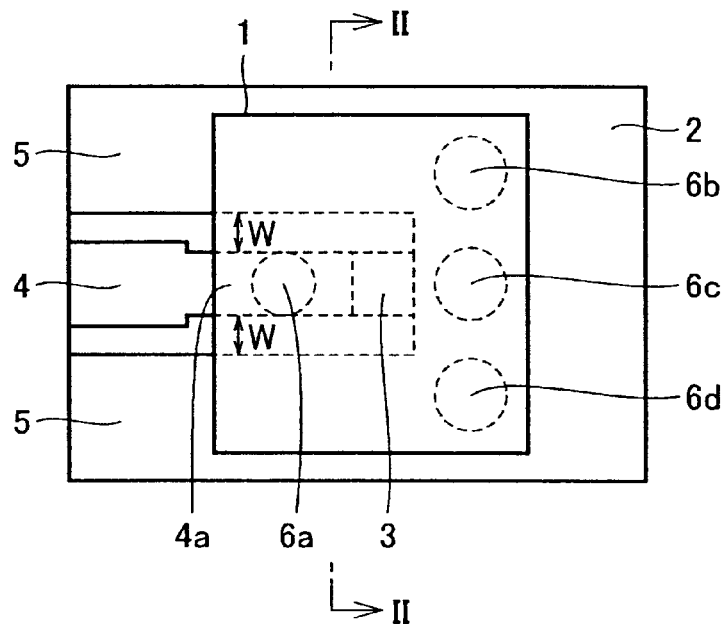
FIG. 1 is a plan view of a photoelectric converting semiconductor device in accordance with a first embodiment of the present invention.
Figure 2:
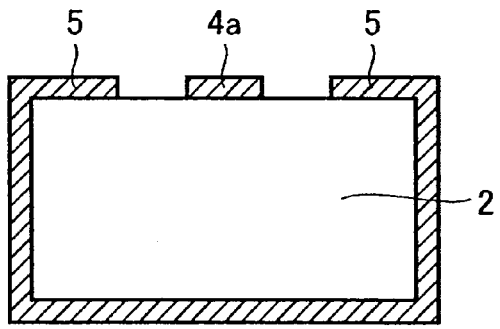
FIG. 2 is a cross section taken along the line II—II of the photoelectric converting semiconductor device shown in FIG. 1.

The photoelectric converting semiconductor device in accordance with the first embodiment of the present invention will be described. As shown in FIGS. 1 and 2, the photoelectric converting semiconductor device of the present invention includes a photoelectric converting semiconductor element 1, a coplanar board 2 for feeding an RF signal to photoelectric converting semiconductor element 1, a terminal resistance 3 for impedance matching, and a coupling optical system for input/output (not shown). In FIG. 2, photoelectric converting semiconductor element 1 is omitted.

On coplanar board 2, a signal line 4 and ground line 5 are formed. Ground line 5 is arranged to sandwich signal line 4 along the direction of extension of signal line 4. Signal line 4 and ground line 5 are electrically connected through terminal resistance 3 for impedance matching. Signal line 4 and the ground line 5 are formed of a conductor such as gold plating.

Photoelectric converting semiconductor element 1 is electrically connected to signal line 4 through a bump electrode 6a, and electrically connected to ground line 5 through bump electrodes 6b, 6c and 6d. Coplanar board 2 is formed, for example, of alumina.

It is noted that in the photoelectric converting semiconductor device, the distance W between the signal line 4 and the ground line 5 positioned in the area where photoelectric converting semiconductor element 1 is mounted is made wider than the distance between the signal line 4 and the ground line 5 positioned in the area where photoelectric converting semiconductor element 1 is not mounted.

Alternatively, in the photoelectric converting semiconductor device, the width of the signal line 4 positioned in the area where photoelectric converting semiconductor element 1 is mounted is made narrower than the width of signal line 4 positioned in the area where photoelectric converting semiconductor element 1 is not mounted.

Figure 5:
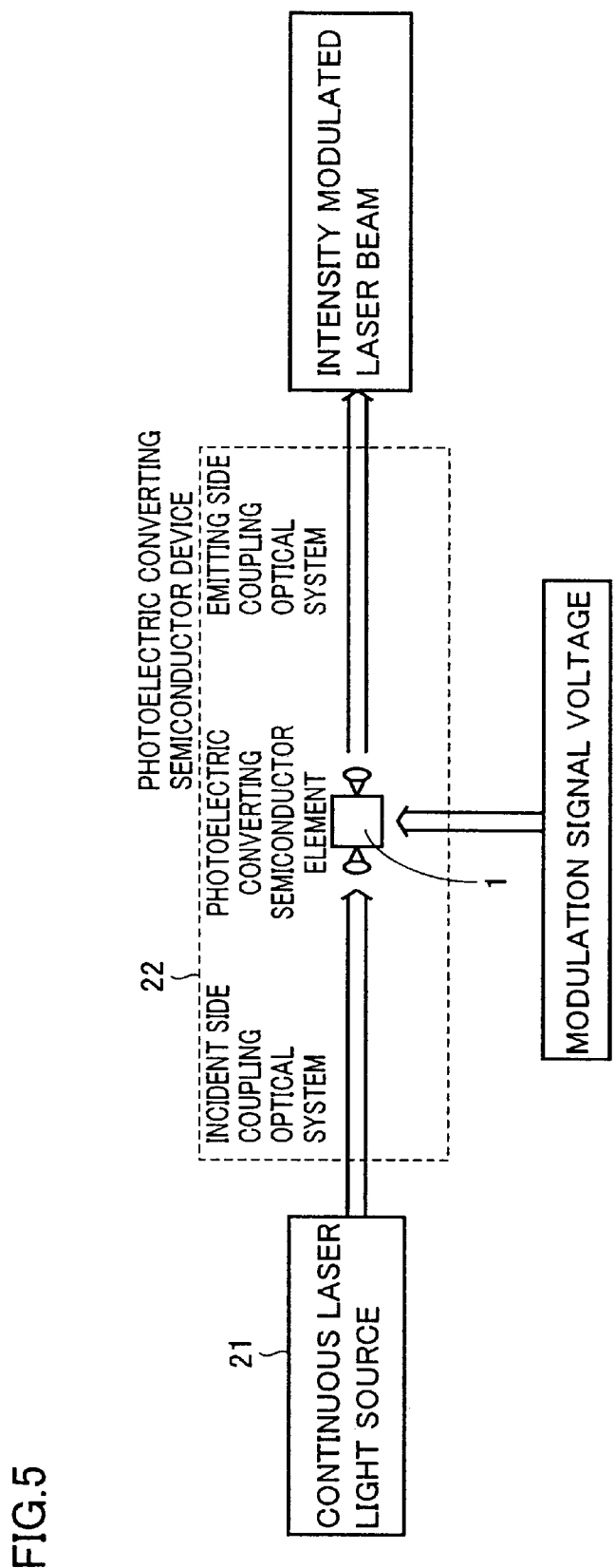
FIG. 5 is a block diagram illustrating an operation of the photoelectric converting semiconductor device of the first embodiment.
Figure 6:
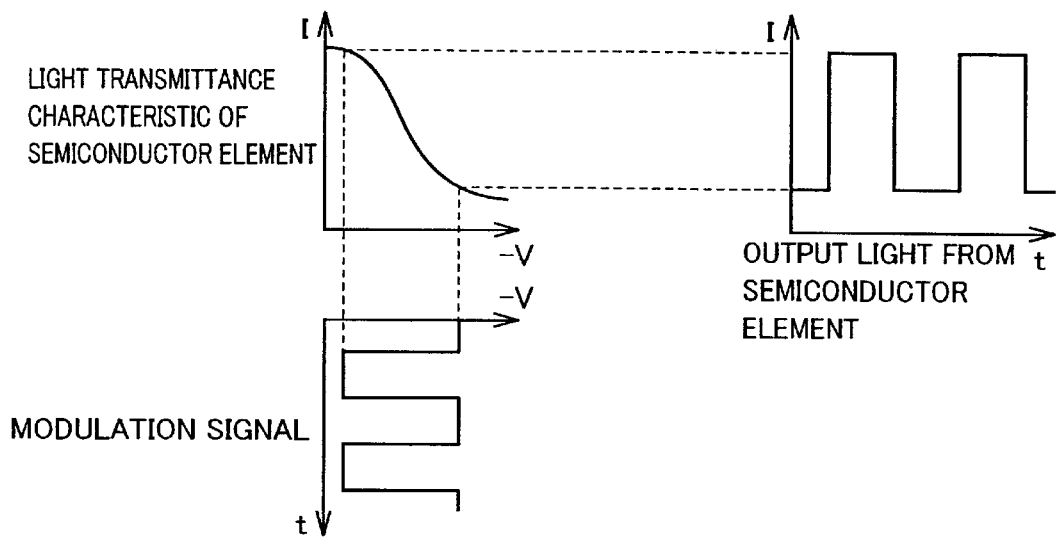
FIG. 6 represents light transmission characteristic of the output light intensity of the semiconductor element and modulation signal dependency, related to the operation of the photoelectric converting semiconductor device of the first embodiment.

Next, an operation of the photoelectric converting semiconductor device of the present invention will be described. Referring to FIG. 5, when the photoelectric converting semiconductor element 1 of photoelectric converting semiconductor device 22 is an optical modulator element, the amount of laser beam absorption emitted from a continuous laser beam source 21 changes in accordance with the modulation signal voltage applied through coplanar board 2.

More specifically, by applying a modulation signal voltage to coplanar board 2, the laser beam emitted from the optical modulator element has its intensity modulated in accordance with the modulation signal voltage, based on the voltage and the light transmitting characteristic of the optical modulator element, so that a laser beam having the intensity modulated is emitted. Actually, the photoelectric converting semiconductor element absorbs part of the incident laser beam and emits the remaining laser beam.

In this manner, in the photoelectric converting semiconductor device of the present invention, the photoelectric converting semiconductor element receives the laser beam, and the laser beam subjected to the modulation signal voltage is emitted from the photoelectric converting semiconductor element. As the laser beam intensity is modulated, it becomes possible to use the photoelectric converting semiconductor element of the present invention as a signal modulator for optical communication.

As described above, in the photoelectric converting semiconductor device, the width of the signal line 4 or the distance between the signal line 4 and the ground line 5 in the area where the photoelectric converting semiconductor element 1 is mounted is made different from the width of signal line 4 or the distance between signal line 4 and ground line 5 in the area where the photoelectric converting semiconductor element 1 is not mounted.

The distance W between signal line 4 and the ground line 5 or the width of signal line 4 are set such that the impedance (characteristic impedance) comes to have the value of the feeding side impedance in the state where the photoelectric converting semiconductor element 1 is mounted on coplanar board 2. This will be described in the following.

Figure 3:
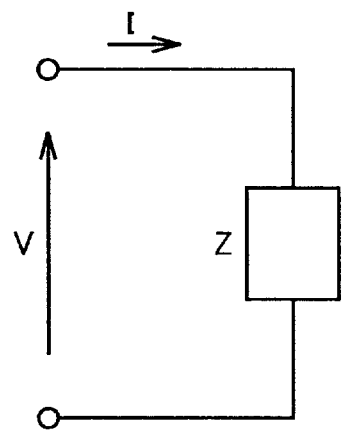
FIG. 3 is a block diagram illustrating impedance of the coplanar board in the first embodiment.

Basically, the impedance has such a relation with the current and the voltage as described below. Namely, referring to FIG. 3, when a current I is caused to flow through a black box having an impedance Z, the voltage V between opposing ends is represented as a product of impedance Z by the current I.

Figure 4:
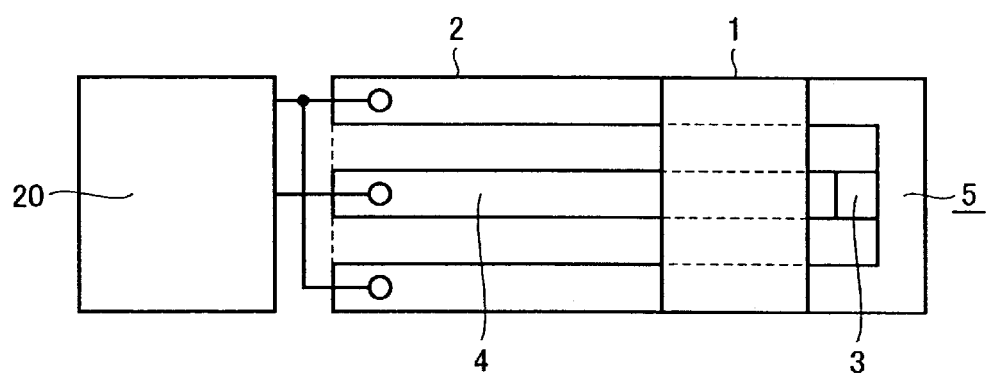
FIG. 4 shows configuration of various portions illustrating the impedance of the coplanar board of the first embodiment.

In a photoelectric converting semiconductor device, the impedance includes, as shown in FIG. 4, the impedance on the side of the feeding portion 20 feeding power to coplanar board 2, an impedance coming from coplanar board 2, and an impedance coming from the terminal resistance.

When these three impedance values differ, the electrical characteristic of photoelectric converting semiconductor device degrades eventually, and therefore, the device is designed such that the impedance values are the same. More specifically, the design is made to maintain impedance integrity. Of these three impedances, the characteristic impedance is determined by dielectric constant and thickness of coplanar board 2, the width of signal line 4 and the distance between the signal line 4 and the ground line 5.

Particularly, in the present photoelectric converting semiconductor device, it is possible to significantly suppress characteristic impedance variation when the photoelectric converting semiconductor element 1 is mounted on coplanar board 2, by making narrower the width of signal line 4 or making wider the distance between the signal line 4 and the ground line 5, in the area where the photoelectric converting semiconductor element is mounted, as described above.

This will be described in greater detail. When an alumina having the thickness of 0.254 mm (dielectric constant: about 10) is used as the coplanar board and the width of the signal line is set to 80 $\mu$m, there is such a correlation as shown in graph A of FIG. 7, between the characteristic impedance and the distance between the signal line and the ground line.

Therefore, in order to have the characteristic impedance value of the photoelectric converting semiconductor device substantially the same as the value of the feeding side impedance, the distance between the signal line and the ground line should be determined based on the correlation.

Figure 7:
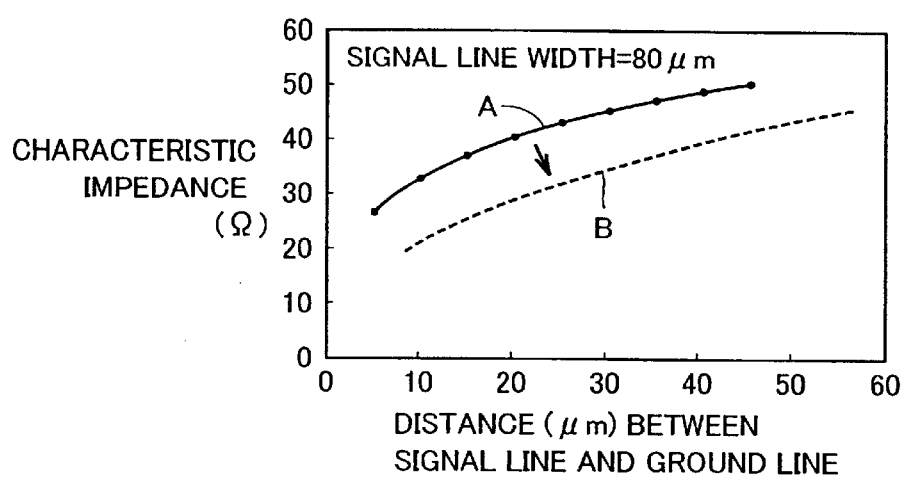
FIG. 7 is a graph representing correlation between the distance between the signal line and the ground line and the characteristic impedance in the first embodiment.

Here, it is noted that when the photoelectric converting semiconductor element is brought close to the coplanar board, the correlation between the characteristic impedance and the distance between the signal line and the ground line changes as shown in graph B of FIG. 7.

Therefore, in order to have the characteristic impedance value of the photoelectric converting semiconductor device match the feeding side impedance value, the distance between the signal line and the ground line must be made wider.

As a result, the characteristic impedance value when photoelectric converting semiconductor element 1 is mounted on coplanar board 2 comes to have substantially the same value as remaining two impedances, and hence degradation of the electric characteristic of the photoelectric converting semiconductor device can be prevented.

Second Embodiment

The photoelectric converting semiconductor device in accordance with a second embodiment of the present invention will be described. In the photoelectric converting semiconductor device, the distance W between signal line 4 and ground line 5 positioned in the area where photoelectric converting semiconductor element 1 is mounted is made wider than the distance between signal line 4 and the ground line 5 positioned in the area where photoelectric converting semiconductor element 1 is not mounted. Meanwhile, the width of signal line 4 positioned in the area where photoelectric converting semiconductor element 1 is mounted is substantially the same as the width of signal line 4 positioned in the area where photoelectric converting semiconductor element 1 is not mounted.

Except this point, the structure of the photoelectric converting semiconductor device is the same as that shown in FIG. 1 of the first embodiment, and therefore, corresponding members are denoted by the same reference characters and description thereof will not be repeated.

In the photoelectric converting semiconductor device, as already described, by making wider the distance between signal line 4 and ground line 5 in the area where photoelectric converting semiconductor element 1 is mounted, characteristic impedance variation when photoelectric converting semiconductor element 1 is mounted on coplanar board 2 can be suppressed significantly.

Particularly in the present photoelectric converting semiconductor device, the width of the signal line 4 positioned in the area where photoelectric converting semiconductor element 1 is mounted is substantially the same as the width of signal line 4 positioned in an area where photoelectric converting semiconductor element 1 is not mounted, that is, the width of signal line 4 is not made narrower, whereby variation of the characteristic impedance can be suppressed.

Figure 9:
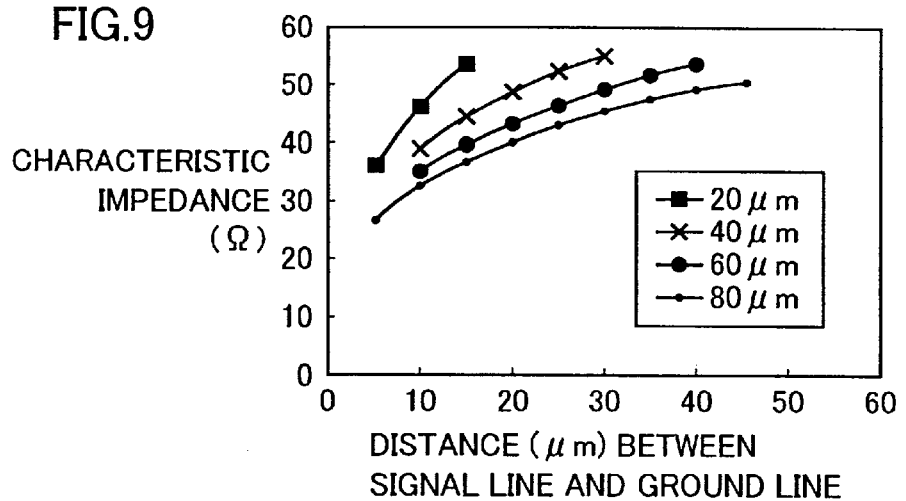
FIG. 9 is a graph representing correlation between the distance between the signal line and the ground line and the characteristic impedance, with the width of the signal line changed variously.

This will be described. For various widths of the signal line, there are such correlations as shown in FIG. 9 between the characteristic impedance and the distance between the signal line and the ground line. As can be seen from FIG. 9, as the width of the signal line becomes narrower, the inclination of the graph representing the correlation of the characteristic impedance and the distance between the signal line and the ground line tends to be steep, and hence, it is expected that the characteristic impedance value vary widely, associated with the manufacturing error of the coplanar board.

Therefore, by making wider the distance between signal line 4 and ground line 5 while not making narrower the width of signal line 4, it becomes possible to suppress variation of the characteristic impedance associated with the manufacturing error of the coplanar board, and to set the characteristic impedance to substantially the same value as the feeding side impedance value.

As a result, in a state where photoelectric converting semiconductor element 1 is mounted on coplanar board 2, the characteristic impedance value becomes substantially the same as remaining two impedances, and degradation of the electric characteristic of the photoelectric converting semiconductor device can be prevented.

Third Embodiment

The photoelectric converting semiconductor device in accordance with a third embodiment of the present invention will be described. Among photoelectric converting semiconductor elements mounted on a coplanar board, some include a power feed electrode for electrically connecting bump electrodes that are in contact with the ground line. A photoelectric converting semiconductor device including a photoelectric converting semiconductor element having such a power feed electrode will be described in the following.

Figure 10:
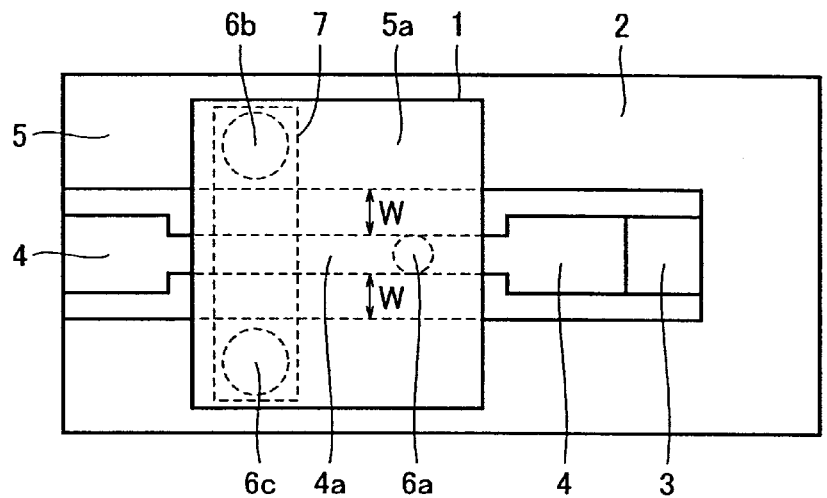
FIG. 10 is a plan view of a photoelectric converting semiconductor device in accordance with a third embodiment.

As shown in FIG. 10, in the photoelectric converting semiconductor device, the distance W between signal line 4 and the ground line 5 positioned in the area where photoelectric converting semiconductor element 1 is mounted is made wider than the distance between signal line 4 and the ground line 5 positioned in the area where photoelectric converting semiconductor element 1 is not mounted, and the width of signal line 4 positioned in the area where photoelectric converting semiconductor element 1 is mounted is made narrower than the width of signal line 4 positioned in the area where photoelectric converting semiconductor element 1 is not mounted.

Except this point, the structure is the same as that of the photoelectric converting semiconductor device shown in FIG. 1 described with respect to the first embodiment. Therefore, corresponding members are denoted by the same reference characters and description thereof will not be repeated.

Particularly when the photoelectric converting semiconductor element has a power feed electrode 7, a parasitic capacitance is generated between signal line 4 and power feed electrode 7 when photoelectric converting semiconductor element is mounted on coplanar board 2. Therefore, when the photoelectric converting semiconductor element 1 is mounted on coplanar board 2, it is expected that the characteristic impedance deviates from the feeding side impedance due to the parasitic resistance, degrading electrical characteristic of the photoelectric converting semiconductor device.

Therefore, by narrowing the width of signal line 4 positioned in the area where photoelectric converting semiconductor element 1 is mounted, it becomes possible to reduce the parasitic resistance between signal line 4 and power feed electrode 7, so that characteristic impedance variation when photoelectric converting semiconductor element 1 is mounted on coplanar board can effectively be suppressed, and degradation of the electrical characteristic of the photoelectric converting semiconductor device can be suppressed.

When compared with the photoelectric converting semiconductor device including a photoelectric converting semiconductor element not having the power feed electrode described with respect to the first embodiment, it is necessary to reduce the parasitic capacitance between signal line 4 and power feed electrode 7 in the present photoelectric converting semiconductor device, and therefore, it is desired to make narrower the width of the signal line 4.

In the present photoelectric converting semiconductor device, terminal resistance 3 is not arranged on that region where photoelectric converting semiconductor element 1 is mounted. Therefore, heat generated by the terminal resistance 3 is prevented from directly propagating to photoelectric converting semiconductor element 1, and hence influence of the heat can be suppressed.

Fourth Embodiment

Figure 11:
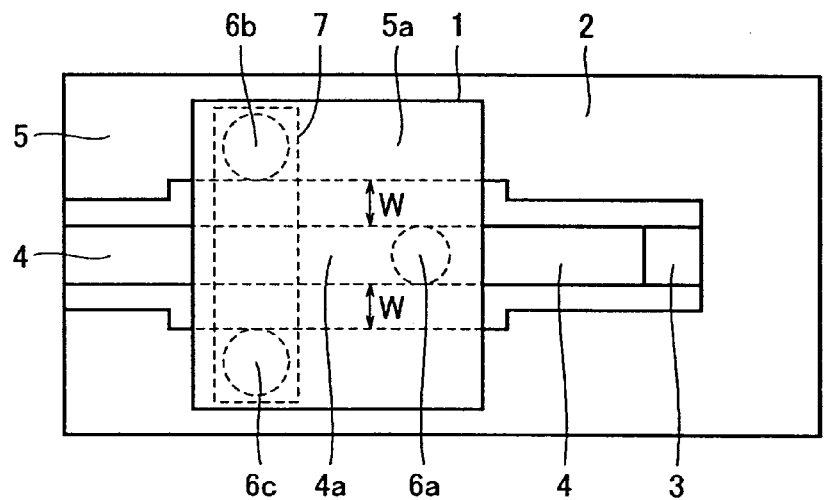
FIG. 11 is a plan view of a photoelectric converting semiconductor device in accordance with a fourth embodiment of the present invention.

A photoelectric converting semiconductor device in accordance with a fourth embodiment of the present invention will be described. In the present photoelectric converting semiconductor device, the photoelectric converting semiconductor element has a power feed electrode, the width of the signal line positioned in the area where photoelectric converting semiconductor element 1 is mounted is substantially the same as the width of signal line 4 positioned in the area where photoelectric converting semiconductor element 1 is not mounted, and the distance W between signal line 4 and ground line 5 positioned in the area where photoelectric converting semiconductor element 1 is mounted is made wider than the distance between signal line 4 and ground line 5 positioned in the area where photoelectric converting semiconductor element 1 is not mounted, as shown in FIG. 11.

Figure 8:
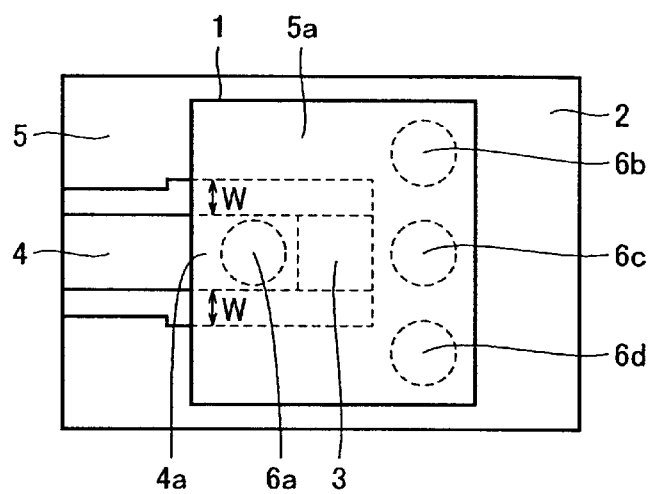
FIG. 8 is a plan view of a photoelectric converting semiconductor device in accordance with a second embodiment of the present invention.

Except this point, the structure is the same as the photoelectric converting semiconductor device shown in FIG. 8 described with respect to the first embodiment, and therefore, corresponding members are denoted by the same reference characters and description thereof will not be repeated.

In the present photoelectric converting semiconductor device, the distance between signal line 4 and ground line 5 is made wider while the width of signal line 4 is not made narrower as described with respect to the second embodiment, so that variation of characteristic impedance associated with manufacturing error of the coplanar board can be suppressed, and the characteristic impedance can be set to substantially the same value as the feeding side impedance.

As described with respect to the third embodiment, when photoelectric converting semiconductor element 1 is mounted on coplanar board 2, it is expected that the characteristic impedance deviates from the value of the feeding side impedance, due to the parasitic resistance generated between signal line 4 and power feed electrode 7.

In the present photoelectric converting semiconductor device, however, the distance between signal line 4 and ground line 5 is made wider than in the second embodiment, so that variation of the characteristic impedance when photoelectric converting semiconductor element 1 is mounted on the coplanar board 2 can effectively be suppressed, and degradation of the electrical characteristic of the photoelectric converting semiconductor device can be suppressed.

In the photoelectric converting semiconductor device, the terminal resistance 3 is not arranged in the area where the photoelectric converting semiconductor element 1 is mounted. Therefore, direct propagation of heat generated by terminal resistance 3 to the photoelectric converting semiconductor element 1 is suppressed, and the influence of heat can be reduced.

Fifth Embodiment

Figure 12:
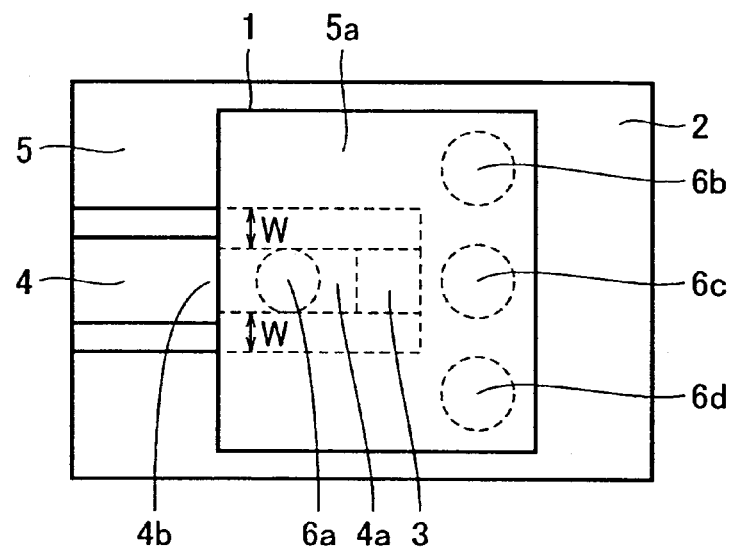
FIG. 12 is a plan view of a photoelectric converting semiconductor device in accordance with a fifth embodiment of the present invention.

A photoelectric converting semiconductor device in accordance with a fifth embodiment of the present invention will be described. In the photoelectric converting semiconductor device, the distance W between signal line 4 and ground line 5 positioned in the area where photoelectric converting semiconductor element 1 is mounted is made wider than the distance between signal line 4 and ground line 5 positioned in the area where photoelectric converting semiconductor element 1 is not mounted, and the width of signal line 4 positioned in the area where photoelectric converting semiconductor element 1 is mounted is made narrower than the width of signal line 4 positioned in the area where photoelectric converting semiconductor element 1 is not mounted, as shown in FIG. 12.

In the photoelectric converting semiconductor device, the portion at which the width of signal line 4 changes is utilized as a mark when the photoelectric converting semiconductor element 1 is mounted on coplanar board 2. Namely, photoelectric converting semiconductor element 1 is mounted on coplanar board 2 aligned with that portion at which the width of signal line 4 changes, and therefore, the mounting position can be clearly recognized, which leads to improved mounting accuracy.

As a result, variation of the characteristic impedance associated with variation of the mounting position of photoelectric converting semiconductor element 1 can be suppressed, and degradation of the electrical characteristic of the photoelectric converting semiconductor device can be prevented.

Sixth Embodiment

Figure 13:
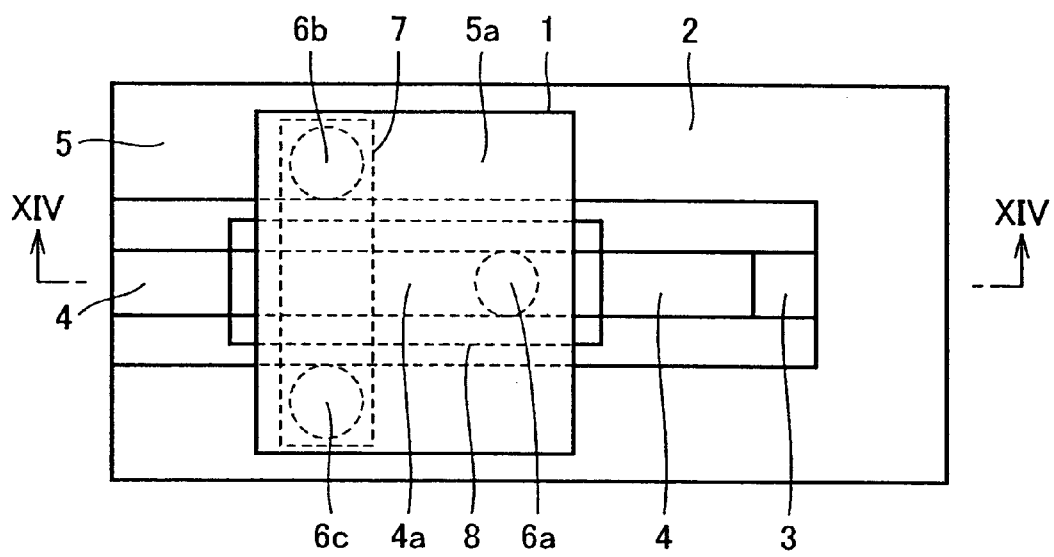
FIG. 13 is a plan view of a photoelectric converting semiconductor device in accordance with a sixth embodiment of the present invention.
Figure 14:
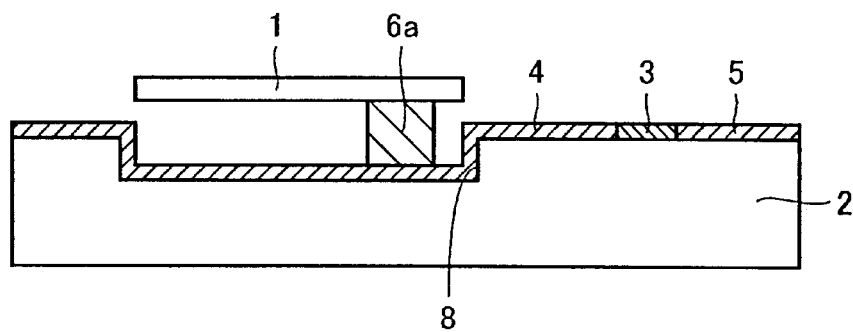
FIG. 14 is a cross section taken along the line XIV—XIV of the photoelectric converting semiconductor device shown in FIG. 13.

A photoelectric converting semiconductor device in accordance with a sixth embodiment of the present invention will be described. In the present photoelectric converting semiconductor device, in the area where photoelectric converting semiconductor element 1 is mounted, a recess 8 is formed at a portion of coplanar board 2, as shown in FIGS. 13 and 14. Signal line 4 is formed in the recess 8, and therefore it follows that in the area where photoelectric converting semiconductor element 1 is mounted, signal line 4 and ground line 5 are formed on mutually different planes.

The width of signal line 4 positioned in the area where photoelectric converting semiconductor element 1 is mounted is substantially the same as the width of signal line 4 positioned in the area where photoelectric converting semiconductor element 1 is not mounted.

Except this point, the structure is substantially the same as that of the photoelectric converting semiconductor device shown in FIG. 11 described with respect to the fourth embodiment, and therefore corresponding members are denoted by the same reference characters and description thereof will not be repeated.

In coplanar board 2, an electric field is confined by signal line 4 and ground line 5. Therefore, characteristic impedance of the coplanar board is determined also by the positional relation of planes on which signal line 4 and ground line 5 are formed, respectively.

Therefore, in the present photoelectric converting semiconductor device, utilizing this nature, the plane on which signal line 4 is formed and the plane on which ground line 5 is formed are made different in the region where the photoelectric converting semiconductor element is mounted, so that variation of the characteristic impedance when photoelectric converting semiconductor element 1 is mounted on coplanar board 2 can significantly be suppressed.

As a result, in a state where photoelectric converting semiconductor element 1 is mounted on coplanar board 2, the value of the characteristic impedance becomes substantially the same as remaining two impedances, and degradation of the electrical characteristic of the photoelectric converting semiconductor device can be prevented.

Though signal line 4 is formed in recess 8 in the present embodiment, ground line 5 may be formed in the recess.

Seventh Embodiment

A photoelectric converting semiconductor device in accordance with a seventh embodiment of the present invention will be described. In the photoelectric converting semiconductor device described above, when the width of the signal line is changed, the change is relatively steep.

Figure 15:
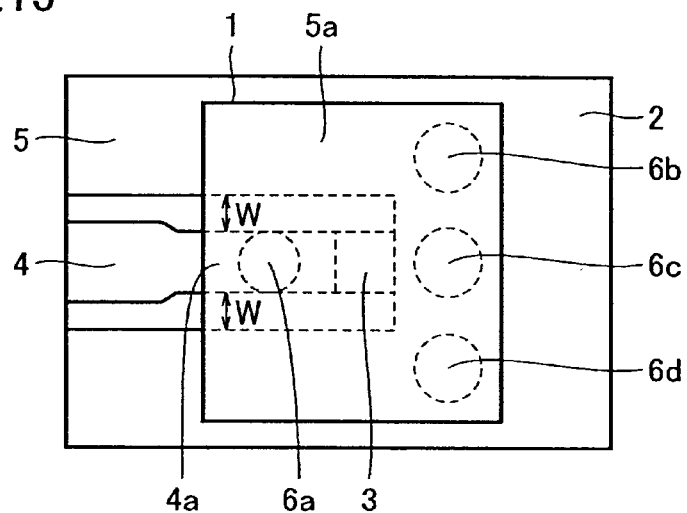
FIG. 15 is a plan view of a photoelectric converting semiconductor device in accordance with a seventh embodiment of the present invention.
Figure 16:
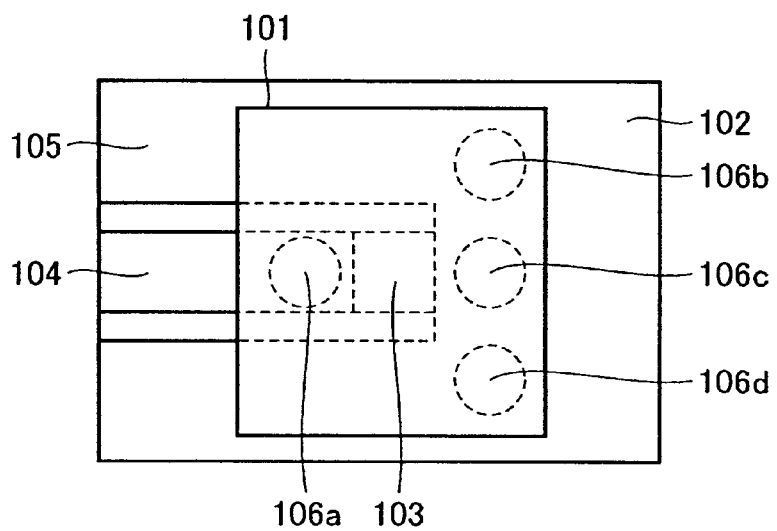
FIG. 16 is a plan view of a conventional photoelectric converting semiconductor device.

In the present photoelectric converting semiconductor device, the width of signal line 4 changes from a wide portion to a narrow portion smooth as shown in FIG. 15, and the width of the signal line 4 in the region where the photoelectric converting semiconductor element is mounted is made narrower than the width of signal line 4 in the area where photoelectric converting semiconductor element 1 is not mounted.

Except this point, the structure is the same as the photoelectric converting semiconductor device shown in FIG. 1 described with respect to the first embodiment. Therefore, corresponding members are denoted by the same reference characters and description thereof will not be repeated.

When an AC signal is applied to coplanar board 2, part of the applied signal returns because of reflection. Assuming that the degree of reflection is 3 dB (50%), when 3V is applied, 1.5V returns by reflection, and therefore, it is the case that substantially only 1.5V is applied.

Further, dependent on the coplanar board, reflection may increase or, to the contrary, decrease at a specific frequency. In such a case, the applied voltage increases or decreases at a specific frequency, degrading a signal after photoelectric conversion.

Therefore, the width of signal line 4 is changed smooth from a wide portion to a narrow portion, so that reflection on the signal line is suppressed and the above described problem can be solved. Thus, degradation of the electrical characteristic of the photoelectric converting semiconductor device can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A photoelectric converting semiconductor device, comprising:
   a board;
   a signal line formed and extending on said board;
   a ground line formed on said board and extending spaced apart from said signal line;
   a resistance portion formed on said board and electrically connecting said signal line to said ground line; and
   a photoelectric converting semiconductor element mounted on said board to cover said signal line and said ground line, electrically connected to said signal line and said ground line and receiving a modulation signal transmitted from a power feed portion for transmitting the modulation signal, to modulate and output a received light; wherein
   impedance is substantially the same as impedance of said power feed portion; and
   in order to suppress variation of the impedance when said photoelectric converting semiconductor element is mounted on said board, arrangement relation of said signal line and said ground line positioned in an area where said photoelectric converting semiconductor element is mounted is made different from arrangement relation between said signal line and said ground line positioned in an area where said photoelectric converting semiconductor element is not mounted,
   said signal line and said ground line positioned in the area where said photoelectric converting semiconductor element is not mounted extend spaced by a first distance as said distance; and
   said signal line and said ground line positioned in the area where said photoelectric converting semiconductor element is mounted extend spaced by a second distance wider than said first distance
   an additional ground line arranged on a side opposite to the side on which said ground line is positioned along the direction of extension of said signal line, and electrically connected to said ground line; wherein
   said photoelectric converting semiconductor element has an electrode portion electrically connecting said ground line to said additional ground line; and
   width of said signal line is narrower than said signal line width in a photoelectric converting semiconductor element not having a power feed electrode.

2. The photoelectric converting semiconductor device according to claim 1, wherein
   said signal line positioned in the area where said photoelectric converting semiconductor element is mounted has a prescribed width narrower than width of said signal line positioned in the area where said photoelectric converting semiconductor element is not mounted.

3. The photoelectric converting semiconductor device according to claim 1, further comprising
   an additional ground line arranged on a side opposite to the side where said ground line is positioned along the direction of extension of said signal line, and electrically connected to said ground line; wherein
   distance between said ground line and said additional ground line positioned in the area where said photoelectric converting semiconductor element is mounted is wider than distance between said ground line and said additional ground line positioned in the area where said photoelectric converting semiconductor element is not mounted.

4. The photoelectric converting semiconductor device according to claim 1, wherein
   said signal line has its width changed steeply from the area where said photoelectric converting semiconductor element is mounted to the area where said photoelectric converting semiconductor element is not mounted, and said photoelectric converting semiconductor element is mounted aligned with a portion where the width changes steeply.

5. The photoelectric converting semiconductor device according to claim 1, wherein
   said signal line has its width changed smooth from the area where said photoelectric converting semiconductor element is mounted to the area where said photoelectric converting semiconductor element is not mounted.

6. The photoelectric converting semiconductor device according to claim 1, wherein
   said signal line and said ground line positioned in the region where said photoelectric converting semiconductor element is not mounted are arranged on one same plane; and said signal line and said ground line positioned in the area where said photoelectric converting semiconductor element is mounted are arranged on mutually different planes substantially parallel to said one same plane.

7. A photoelectric converting semiconductor device, comprising:

a board;

a signal line formed and extending on said board;

a ground line formed on said board and extending spaced apart from said signal line;

a resistance portion formed on said board and electrically connecting said signal line to said ground line; and a photoelectric converting semiconductor element mounted on said board to cover said signal line and said ground line, electrically connected to said signal line and said ground line and receiving a modulation signal transmitted from a power feed portion for transmitting the modulation signal, to modulate and output a received light; wherein impedance is substantially the same as impedance of said power feed portion; and in order to suppress variation of the impedance when said photoelectric converting semiconductor element is mounted on said board, arrangement relation of said signal line and said ground line positioned in an area where said photoelectric converting semiconductor element is mounted is made different from arrangement relation between said signal line and said ground line positioned in an area where said photoelectric converting semiconductor element is not mounted said signal line and said ground line positioned in the area where said photoelectric converting semiconductor element is not mounted extend spaced by a first distance as said distance; and said signal line and said ground line positioned in the area where said photoelectric converting semiconductor element is mounted extend spaced by a second distance wider than said first distance;

said signal line has its width changed steeply from the area where said photoelectric converting semiconductor element is mounted to the area where said photoelectric converting semiconductor element is not mounted, and said photoelectric converting semiconductor element is mounted aligned with a portion where the width changes steeply.

8. A photoelectric converting semiconductor device, comprising:

a board;

a signal line formed and extending on said board;

a ground line formed on said board and extending spaced apart from said signal line;

a resistance portion formed on said board and electrically connecting said signal line to said ground line; and a photoelectric converting semiconductor element mounted on said board to cover said signal line and said ground line, electrically connected to said signal line and said ground line and receiving a modulation signal transmitted from a power feed portion for transmitting the modulation signal, to modulate and output a received light; wherein impedance is substantially the same as impedance of said power feed portion; and in order to suppress variation of the impedance when said photoelectric converting semiconductor element is mounted on said board, arrangement relation of said signal line and said ground line positioned in an area where said photoelectric converting semiconductor element is mounted is made different from arrangement relation between said signal line and said ground line positioned in an area where said photoelectric converting semiconductor element is not mounted an additional ground line arranged on a side opposite to the side where said ground line is positioned along the direction of extension of said signal line, and electrically connected to said ground line; wherein distance between said ground line and said additional ground line positioned in the area where said photoelectric converting semiconductor element is mounted is wider than distance between said ground line and said additional ground line positioned in the area where said photoelectric converting semiconductor element is not mounted.

9. A photoelectric converting semiconductor device, comprising:

a board;

a signal line formed and extending on said board;

a ground line formed on said board and extending spaced apart from said signal line;

a resistance portion formed on said board and electrically connecting said signal line to said ground line; and a photoelectric converting semiconductor element mounted on said board to cover said signal line and said ground line, electrically connected to said signal line and said ground line and receiving a modulation signal transmitted from a power feed portion for transmitting the modulation signal, to modulate and output a received light; wherein impedance is substantially the same as impedance of said power feed portion; and in order to suppress variation of the impedance when said photoelectric converting semiconductor element is mounted on said board, arrangement relation of said signal line and said ground line positioned in an area where said photoelectric converting semiconductor element is mounted is made different from arrangement relation between said signal line and said ground line positioned in an area where said photoelectric converting semiconductor element is not mounted;

said signal line and said ground line positioned in the region where said photoelectric converting semiconductor element is not mounted are arranged on one same plane; and said signal line and said ground line positioned in the area where said photoelectric converting semiconductor element is mounted are arranged on mutually different planes substantially parallel to said one same plane.

* * * * *

UNITED STATES PATENT AND TRADEMARK OFFICE
CERTIFICATE OF CORRECTION

PATENT NO.    : 6,552,365 B2
DATED         : April 22, 2003
INVENTOR(S)   : Toshiharu Miyahara It is certified that error appears in the above-identified patent and that said Letters Patent is hereby corrected as shown below:

<u>Column 12,</u>
Lines 24-26, delete "width of said signal line is narrower than said signal line width in a photoelectric converting semiconductor element not having a power feed electrode" and insert -- a width of said signal line inside the photoelectric converting semiconductor element is narrower than a width of said signal line outside the photoelectric converting semiconductor element --

Signed and Sealed this

Ninth Day of September, 2003

JAMES E. ROGAN
*Director of the United States Patent and Trademark Office*